United States Patent [19]

Cory

[11] 3,910,821

[45] Oct. 7, 1975

[54] ENZYMATIC ISOMERIZATION PRODUCT

[75] Inventor: Robert Paul Cory, La Grange, Ill.

[73] Assignee: CPC International Inc., Englewood Cliffs, N.J.

[22] Filed: June 13, 1974

[21] Appl. No.: 479,064

Related U.S. Application Data

[60] Continuation of Ser. No. 292,849, Oct. 4, 1972, which is a division of Ser. No. 12,837, Feb. 19, 1970, abandoned.

[52] U.S. Cl. ............... 195/31 F; 127/29; 127/42
[51] Int. Cl.² ............... C13D 13/04; C13K 1/00; C13K 11/00
[58] Field of Search ......... 127/30, 29, 41, 42, 46 R, 127/46 A; 195/31 F

[56] References Cited
UNITED STATES PATENTS

| | | | |
|---|---|---|---|
| 2,746,889 | 5/1956 | Langlois | 127/46 A X |
| 3,285,776 | 11/1966 | Scallet | 195/31 F |
| 3,305,395 | 2/1967 | Scallet | 127/46 R X |
| 3,383,245 | 5/1968 | Scallet | 127/46 R |
| 3,558,355 | 1/1971 | Okazaki | 127/41 X |
| 3,616,221 | 10/1971 | Takasaki | 195/31 F |
| 3,623,953 | 11/1971 | Cotter | 195/31 F |
| 3,684,574 | 8/1972 | Katz | 127/46 A |
| 3,694,314 | 9/1972 | Lloyd | 195/31 F |
| 3,788,945 | 1/1974 | Thompson | 195/31 F |
| 3,834,940 | 9/1974 | Khaleeluddin | 127/46 A |

Primary Examiner—Morris O. Wolk
Assistant Examiner—Sidney Marantz
Attorney, Agent, or Firm—Albert P. Halluin, Esq.; Frank E. Robbins, Esq.

[57] ABSTRACT

The exclusion of oxygen from an enzymatic isomerization process, wherein a starch hydrolysate is isomerized to levulose, prevents loss of isomerase activity. Air (oxygen) is excluded by blanketing the process mixture with nitrogen, or, preferably, the hydrolysate-enzyme mixture is mildly agitated while bubbling nitrogen or some other inert gas through the mixture. Under non-oxidizing conditions, the isomerization can advantageously be conducted at a pH of 7.0 or lower and at a temperature of 65°C or higher. The product contains less than 2% by weight, dry basis, of psicose.

10 Claims, No Drawings

ENZYMATIC ISOMERIZATION PRODUCT

This application is a continuation application of U.S. patent application Ser. No. 292,849, filed Oct. 4, 1972, which is a divisional application of application Ser. No. 12,837, filed Feb. 19, 1970, which is now abandoned.

This invention relates to an enzymatic isomerization process. More particularly, the invention relates to the isomerization of starch hydrolysates that contain glucose, to produce levulose-bearing products, by enzymatic isomerization.

One object of the present invention is to provide an improved enzymatic isomerization process, for the production of ketose-bearing products.

Other objects of the invention will be apparent hereinafter from the specification and from the recitals of the appended claims.

I have found that the enzymatic isomerization of aldose sugar to ketose sugar, and particularly the enzymatic isomerization of glucose to levulose, can be substantially improved by conducting the isomerization under non-oxidizing conditions. One preferred mode for the practice of the invention involves bubbling nitrogen, argon, or some other inert gas through the isomerizing mixture of sugar plus enzyme preparation, simultaneously with mild agitation of the mixture, to exclude oxygen (air), while establishing, at the same time, an inert atmosphere above the isomerization mixture.

The particular isomerization to which this invention is addressed is the isomerization of glucose to levulose. When this isomerization is conducted with the production and recovery of levulose-bearing solutions in which the levulose concentration is at a significant level, such as, for example, from about 1% by weight to about 40% by weight or more dry substance basis, the sweetness of the product is enhanced. This increases its economic value for many applications.

In recent years, and particularly since the issuance of the pioneer patent in this field, U.S. Pat. No. 2,950,228, granted to Richard O. Marshall on Aug. 23, 1960, there has been a great amount of activity in connection with enzymatic isomerization. Several different microbial sources of glucose isomerase enzyme preparations have been identified. In some cases, the enzyme which isomerizes glucose to levulose has been termed xylose isomerase, as for example, in the Marshall patent.

The process of the present invention can be employed, so far as it is known, with all types of glucose isomerase enzyme preparations. These enzyme preparations can be derived from a large number of different microbial sources. Each enzyme preparation seems to have its own particular characteristics. The characteristics of each enzyme preparation, such as, for example, its optimum pH, its optimum temperature, the required metal ions, its Michaelis constant, and the mechanism of levulose formation, seem to be somewhat different from one enzyme preparation to another. However, the process of the present invention seems to be applicable to all of these known glucose isomerase enzyme preparations.

The isomerization may be conducted by adding the enzyme preparation, in soluble form, to a sugar solution such as, for example, a glucose containing syrup. There have also been investigations of the use of such enzyme preparations in insoluble form, particularly with respect to the development of continuous isomerization processes. The present invention can be applied to all such processes.

The invention will now be further described by referring to its practice in detail with respect to one or more preferred embodiments thereof. All parts and percentages are by weight unless expressly stated to be otherwise, and are on an "as is" basis unless stated to be on a dry or other basis.

EXAMPLE 1

Isomerization Of A 95 D.E. Starch Hydrolysate Using Glucose Isomerase Enzyme Preparation Derived From A Streptomyces Strain This example represents practice of the present invention in accordance with one preferred mode thereof.

Fermentation

A. Inoculum Development

Spores from a slant of *Streptomyces olivochromogenes* ATCC 21114 were inoculated into several 500 ml. Erlenmeyer flasks each containing 100 ml. quantities of a sterile medium composed of the ingredients described below in Table I.

TABLE I

| Ingredients | Weights |
|---|---|
| Xylose | 5.0 g. |
| Corn Starch | 5.0 g. |
| Corn Steep Liquor | 40.0 g. |
| Magnesium Sulfate ($MgSO_4.7H_2O$) | 5.0 g. |
| Cobalt Chloride ($CoCl_2.6H_2O$) | 0.24 g. |
| Distilled Water | 1000 ml. |

The pH of the culture medium was adjusted to 7.1 with sodium hydroxide prior to sterilization. The flasks were inoculated and incubated for 60 hours at a temperature in the range from about 28°C to about 30°C on a reciprocating shaker.

B. Production Of The Enzyme Preparation

Aliquot portions of 10 ml. each were taken from the inoculum flasks. These aliquots were used to inoculate 1000 ml. Hinton modified Erlenmeyer flasks each containing a quantity of 200 ml. of sterile medium of the following compositions:

TABLE II

| Ingredients | Weights |
|---|---|
| Xylose | 10.0 g. |
| Corn Starch | 10.0 g. |
| Corn Steep Liquor | 40.0 g. |
| Brewers' Yeast Extract | 2.5 g. |
| Magnesium Sulfate ($MgSO_4.7H_2O$) | 0.5 g. |
| Cobalt Chloride ($CoCl_2.6H_2O$) | 0.24 g. |
| Distilled Water | 1000 ml. |

The pH was adjusted to 7.1 with sodium hydroxide prior to sterilization. The inoculated flasks were incubated for 48 hours at a temperature in the range from about 28°C to about 30°C on a rotary shaker.

In preparing either of the media described above, xylan hydrolysate can be used in place of xylose with substantially equivalent results. The hydrolysate is an inexpensive source of xylose.

C. harvesting Of The Enzyme Preparation

After fermentation, the contents of the flasks were pooled. The liquor was centrifuged at 10,000 times gravity for 15 minutes. The cell pack was then separated and frozen for storage.

For use, the cell pack or a proportionate part of it was brought back to its original volume with distilled water, and the cells were resuspended. When reconstituted, the cell suspension was found to contain 1.67 units per ml. when assayed in the manner described below. The cell suspension was then either used as such in subsequent demonstrations of the invention as described below, or it was transformed to a solubilized form, as is described below.

D. Conversion Of The Cell Suspension To Solubilized Form

A portion of the cell suspension, that had been reconstituted from a frozen portion of the cell pack, was treated with crystalline lysozyme (General Biochemical, 3X crystalline, 4 micrograms/ml.) for 24 hours at about 25°C. The released enzyme was then adsorbed on DEAE (diethylaminoethyl) cellulose (500 units per gram of cellulose).

The DEAE cellulose was then washed with 0.2 M sodium chloride, which removed very little of the adsorbed enzyme. The cellulose was then eluted with 0.35 M sodium chloride, which eluted most of the isomerase activity.

The resulting enzyme preparation, a solution of glucose isomerase, contained 20 units per ml.

E. Assay Of Isomerase Activity

The assay procedure involved making a spectrophotometric determination of the ketose produced from a glucose solution under a standardized set of conditions.

A stock solution was made up in the following manner:

TABLE III

| Component | Amount |
| --- | --- |
| 0.1 M $MgSO_4.7H_2O$ | 1.0 ml. |
| 0.01 M $CoCl_2.6H_2O$ | 1.0 ml. |
| 1 M Phosphate Buffer, pH 7.5 | 0.5 ml. |
| Anhydrous D-Glucose | 1.44 g. |
| Distilled Water | To make up a total volume of 7.5 ml. |

The enzyme preparation to be assayed was first diluted to contain from 1 to 6 isomerase units per ml.

The enzymatic isomerization was conducted by adding 1 ml. of the enzyme preparation to 3 ml. of the stock solution, and incubating for 30 minutes at 60°C. At the end of the incubation period, a 1 ml. aliquot was taken and quenched in a 9 ml. volume of 0.5 N perchloric acid. The quenched aliquot was then diluted to a total volume of 250 ml. As a control, for comparative purposes, a glucose blank was also run by substituting 1 ml. of water for the 1 ml. of the enzyme preparation in solution form, at the beginning of the incubation period.

The ketose was then determined by a cysteine-sulfuric acid method. For the purposes of this assay, one isomerase unit is defined as the amount of enzyme activity that is required to produce one micromole of levulose per minute under the isomerization conditions described.

F. Isomerization Procedure

For the purpose of demonstrating the invention, a standard substrate was prepared and was used in each of the following isomerization demonstrations. This substrate was made up as described in Table IV below.

TABLE IV

| Component | Standardized Substrate Quantity |
| --- | --- |
| 95 D.E. Starch Hydrolysate | 60 g./100 ml. dry basis |
| Cobaltous Chloride | Enough to make the substrate 0.001 Molar |
| Magnesium Sulfate | Enough to make the substrate 0.01 Molar |

This standardized substrate was then subjected to a uniform isomerization procedure in the following examples, so that the results obtained are comparable.

The portion of the substrate to be subjected to enzymatic isomerization was maintained at 70°C in a jacketed vessel. The pH was maintained at about 6.25 by means of additions, as necessary, of small amounts of a saturated solution of sodium bicarbonate. During the isomerization, the substrate was stirred within the vessel by an internal magnetic stirring bar.

The dosage of enzyme activity employed was 0.6 units/gram of dry substance in the standardized substrate. In terms of the enzyme preparation in solubilized form, 7.2 ml. of the enzyme preparation was used for each 400 ml. of the standardized substrate.

Several different gases were utilized in different isomerization reactions, for comparative purposes. For each isomerization, the gas was injected into the isomerizing mixture through a simple capillary tube. The rate of injection was sufficient to cause some agitation of the mixture, and to maintain a blanket of the gas above the mixture.

Following the procedure just described, isomerization reactions were conducted using sweep gas injections in which the gas was air, nitrogen, and argon. For comparative purposes, the isomerization was conducted using the same equipment and procedure, but with no gas injection. The observations made during the several demonstrations are reported in Table V.

TABLE V

Effect Of Different Gases Upon Ketose Formation
Isomerization Period in Hours
% Isomerization Of 95 D.E. Hydrolysate

| | To Ketose | | | To Levulose |
| --- | --- | --- | --- | --- |
| Injected Gas Used | 21 | 44 | 67 | 67 |
| Air | 14.7 | 20.2 | 21.2 | 19.7 |
| $N_2$ | 17.5 | 28.2 | 35.2 | 33.4 |
| Argon | 15.5 | 29.0 | 36.4 | 34.3 |
| None | 17.3 | 27.0 | 30.0 | 28.4 |

As the data in Table V demonstrate, the exclusion of air (oxygen) has the result of permitting a greater amount of ketose formation from the dosage of the enzyme preparation employed. In addition, the data also demonstrate that it is the existence of non-oxidizing conditions, or, in other words, the exclusion of air (oxygen), that is the cause of the effect observed. It is worth noting that argon and nitrogen are components of air, and this is one reason why they were selected for this particular demonstration.

The amount of levulose present in the isomerizate was determined by quantitative paper chromatography. As the data indicate, the amount of levulose present generally is directly proportional to the amount of total ketose. For some purposes, it suffices to use the faster and simpler ketose determination to provide an indication of the amount of levulose produced. However, under certain isomerization conditions, as in Example 4, below, a substantial amount of psicose, another ketohexose, is produced, so that under these conditions, the total ketose determination is not an accurate indicator of the amount of levulose present.

G. Color Characteristics Of The Isomerizates

The two syrups obtained after 67 hours of isomerization, using air and nitrogen injection respectively, were analyzed for the presence of color bodies. To make this analysis, complete spectra were observed for each syrup in the visible range.

From 700 nm to 360 nm, the optical density of the isomerizate syrup produced during air injection was approximately 2.5 times that of the isomerizate syrup produced during nitrogen injection. Therefore, the syrup produced during air injection contained approximately 2.5 times as many color bodies as were present in the syrup produced during nitrogen injection.

While the amount of refining, and its cost to decolorize a syrup is not strictly proportional to the amount of color bodies present, there is a positive relationship. Thus, keeping the isomerization mixture free from air (oxygen) will produce an isomerized syrup that is more economical to refine.

The absorbances of 1/10 dilutions of the two syrups, using distilled water for dilution, are reported in Table VI below.

TABLE VI

| Syrup Produced With Injection Of | Wavelengths In Nanometers Absorbances Of 1/10 Dilutions | | | | | | | |
|---|---|---|---|---|---|---|---|---|
| | 700 | 650 | 600 | 550 | 500 | 450 | 400 | 360 |
| $N_2$ | 0.02 | 0.03 | 0.03 | 0.04 | 0.05 | 0.09 | 0.14 | 0.30 |
| Air | 0.04 | 0.05 | 0.07 | 0.10 | 0.15 | 0.29 | 0.45 | 0.80 |

H. Production Of Acid During Isomerization

During the course of the isomerization, it was observed that the sample that was isomerized during air injection required about 5 times as much of the saturated solution of sodium bicarbonate, to maintain the pH at 6.25, as did the samples with nitrogen injection and argon injection. The isomerization that was conducted without any gas injection, but with ordinary exposure to the atmosphere, required an intermediate amount of sodium bicarbonate solution to maintain its pH; it required between 2 and 3 times as much of the solution as the isomerizations conducted with nitrogen or argon injection. The amount of sodium bicarbonate employed is directly proportional to the amount of acid produced during the isomerization.

The practical effect is that for complete de-ashing, from 2 to 5 times as much ion exchange capacity is needed if an isomerization is conducted with exposure to the atmosphere, as would be the case if the isomerization were conducted with substantial exclusion of air (oxygen). Accordingly, the process of the present invention offers still another opportunity for economies in refining.

EXAMPLE 2

Use Of A Different Strain Of Streptomyces

A species of Streptomyces was isolated from a soil sample. This strain is identified by the proprietary designation CRY-19. This organism produces a pink pigment and is distinctly different from the *S. olivochromogenes* strain employed in Example 1.

This strain was employed for the production of enzyme preparation in cellular form, following the techniques described in Example 1.

The enzyme preparation in cellular form was then used in carrying out two isomerizations, using the procedures described in Example 1. In one isomerization, nitrogen injection was employed. In the other, no gas was injected, but the isomerizing mixture was exposed to the atmosphere. The data observed are reported below in Table VII.

TABLE VII

| Injected Gas Used | Isomerization Period In Hours % Isomerization Of 95 D.E. Hydrolysate To Ketose | | |
|---|---|---|---|
| | 18 | 42 | 66 |
| $N_2$ | 21.3 | 33.5 | 39.7 |
| None | 21.9 | 30.9 | 34.1 |

These data demonstrate that the exclusion of air from contact with the isomerization mixture has a general effect on glucose isomerase enzyme preparations, and not simply a selective action on the glucose isomerase enzyme preparation produced by *S. olivochromogenes*.

EXAMPLE 3

Comparison Of Cellular Enzyme Preparation With Enzyme Preparation In Soluble Form Four isomerizations were conducted following generally the procedures described in Example 1, and using enzyme preparations prepared in accordance with Example 1. The purpose was to provide a comparison of cellular enzyme preparation with enzyme preparation in soluble form. In each case, the dosage level was 0.6 units/gram of dry substance. The data is reported below in Table VIII.

TABLE VIII

| Type Of Enzyme Preparation | Injected Gas Used | Isomerization Period In Hours % Isomerization Of 95 D.E. D.E. Hydrolysate To Ketose | | | |
|---|---|---|---|---|---|
| | | 18 | 42 | 66 | 90 |
| Suspended cells | $N_2$ | 19.8 | 30.5 | 38.6 | 40.9 |
| Suspended cells | None | 19.2 | 29.2 | 33.7 | 37.4 |
| Soluble form | $N_2$ | 25.7 | 36.6 | 41.4 | — |
| Soluble form | None | 23.6 | 32.7 | 35.3 | — |

As the data demonstrate, the enzyme preparation in soluble form gives a higher initial rate of action per unit dosage than an enzyme preparation in which suspended cells are used as the source of the enzyme. However, both forms of enzyme preparation are benefited by the process of the present invention.

Experience indicates that it is often the case that this enzyme preparation in soluble form is inferior in performance to this enzyme preparation in the cellular form, when the isomerization mixture is exposed to the atmosphere (that is, when oxygen is present and available for contact with the enzyme). One proposed explanation has been that enzyme within cells is not as available either to the glucose, that is to be isomerized, or to the oxygen, as is the case when the enzyme is in soluble form.

The data presented demonstrate that the effect of maintaining non-oxidizing conditions is manifested after the isomerization has been in progress for several hours, generally about 24 hours or more.

EXAMPLE 4

Optimization Of pH And Temperature Parameters

Three more isomerizations were conducted using the techniques described in Example 1, and employing enzyme preparation of the cellular type in each case, prepared in accordance with Example 1. Nitrogen gas injection was used in each case, to exclude air and to provide an inert atmosphere above the isomerization mixture.

Samples were taken after 66 hours of isomerization. Values for psicose and levulose were obtained for the samples by quantitative paper chromatography.

The value for levulose that is determined by quantitative paper chromatography includes therein the mannose, sorbose, and togatose that may be present, since paper chromatography cannot ordinarily distinguish between these four sugars. Column chromatography is capable of separating these four components for quantitative analytical purposes, but the procedure of column chromatography is not suitable for routine work such as would be required for practical industrial processes. However, a good correlation exists between the production of psicose and the production of the three hexoses, mannose, sorbose and tagatose. Therefore, generally speaking, a high value for psicose is indicative of low quality in the syrup, that is, it is indicative of the presence of hexoses that are not glucose or levulose.

The data observed from the three isomerizations appear below in Table IX.

a much greater difference between the reported value of 39.4% for ketose and 45.6% for the sum of the reported values of 39.4% for ketose and 45.6% for the sum of the reported values for levulose and for psicose. The reason for this is that paper chromatography cannot separate some of the aldohexoses from levulose. This fact is significant because the prior art has generally recommended that a pH of 7.0 or higher be employed during the isomerization together with a temperature of 65°C or higher, because it has been thought that the enzyme preparation is more active under these conditions. While this appears to be true, unfortunately the greater enzyme activity at the higher pH value is accompanied by more extensive formation of by-products.

Runs 9-2 and 9-3 employed approximately the same dosage of enzyme preparation. Both runs resulted in a production of approximately the same amount of ketose, but at the higher pH employed in Run 9-2, the amount of psicose (and therefore of other products also) was materially higher.

One of the important advantages obtained by conducting the isomerization under conditions where air is excluded is that the enzyme preparation remains stable, even though the pH is on the acid side, for a long enough period of time to permit a substantial isomerization of glucose to levulose, without excessive by-product formation.

GENERAL

Other demonstrations of the invention indicate that the advantages of the use of an inert atmosphere are obtained in large scale production operations as well as in the laboratory-scale demonstrations of the invention that have been described in the preceding examples.

In addition, other demonstrations of the invention indicate that the use of an inert atmosphere is effective during the isomerization of solutions of pure crystalline dextrose, so that the protective effect is not confined to the isomerization of starch hydrolysate syrups.

While nitrogen and argon have been specifically mentioned above as suitable gases for establishing and maintaining non-oxidizing conditions, other gases can also be used, such as, for example, xenon, hydrogen, methyl chloride, the Freons, carbon monoxide, helium, krypton, butane, propane, methane, ethane, hydrogen sulfide, nitrous oxide, and ethylene. Carbon dioxide can also be employed, but it introduces a pH maintenance problem. On the other hand, chlorine and the other halogen gases ordinarily should be avoided, since they react with the enzyme.

TABLE IX

| Run No. | pH | Temp. °C | Dosage Of Enzyme Prep. units/gram | % Ketose | % Psicose | % Levulose |
|---|---|---|---|---|---|---|
| 9-1 | 7.0 | 65 | 1.00 | 39.4 | 4.4 | 41.2 |
| 9-2 | 7.0 | 65 | 0.77 | 38.6 | 1.7 | 38.1 |
| 9-3 | 6.25 | 70 | 0.80 | 38.3 | 0.8 | 39.5 |

Several important conclusions can be drawn from the data presented in Table IX.

From Run No. 9-1, it can be seen that the percentage of ketose is not equal to the sum of the percentages of psicose and levulose present. While the percentage of ketose, as determined by the procedure described in Example 1, is accurate only to a deviation of ± 5% (thus ± 2% in absolute value at 40% ketose), there is The advantages obtained from the use of the present invention are of substantial importance from the commercial standpoint. Ordinarily, when an isomerization is conducted, such as, for example, the isomerization of a 95 D.E. hydrolysate, to produce an isomerized mixture containing from 40% to 45% levulose, a substantial loss of enzymatic activity can be observed. However, when air (oxygen) is excluded as by bubbling nitrogen gas through the isomerization mixture, the loss of enzymatic activity is decreased.

The decreased loss in enzymatic activity permits the production of a desired amount of levulose through the use of a smaller dosage of a given enzyme preparation than would be possible if air were not excluded. In addition, the attractiveness of utilizing an enzyme preparation in soluble form becomes greater because of the decreased loss of enzymatic activity. Moreover, the technique of excluding air is an inexpensive way of effecting stabilization of the enzyme preparation.

In addition, because the greater enzyme stability, milder conditions can be employed for the isomerization, which leads to the production of smaller amounts of by-products which generally are undesirable. Maximum ketose-levulose formation is obtained with minimum by-product formation. The formation of color bodies is decreased by the use of milder isomerization conditions, so that the products produced in accordance with the present invention are easier and less expensive to refine for a given quality of product. Thus, levulose-bearing products containing 30% or more levulose can be produced with less than 2% psicose, and with reduced refining needs.

The greater efficiency that is obtained through the use of the present invention permits the use of either a shorter isomerization time or a lower dosage of the enzyme preparation, to achieve a given levulose content.

Another important advantage of the process is that the maintenance of non-oxidizing conditions apparently minimizes the requirement for cobalt during the isomerization. This may offer cost advantages during isomerization and particularly during subsequent refining.

All of these observed effects and advantages of the present invention permit the final product to be made more economically.

I believe these advantages can be obtained when the invention is practiced with glucose isomerase preparations from any known source. While not wishing to be bound by any theory, I believe that the protection of the enzyme preparation from access to oxygen is responsible for the advantages that are obtained. The reason may be enhanced stability of the enzyme preparation in terms of its activity.

While the invention has been described in connection with specific embodiments thereof, it will be understood that it is capable of further modifications, and this application is intended to cover any variations, uses or adaptions of the invention following, in general, the principles of the invention and including such departures from the present disclosure as come within known or customary practice in the art to which the invention pertains and as may be applied to the essential features hereinbefore set forth, and as fall within the scope of the invention.

I claim:

1. A levulose-bearing syrup which has been produced by the enzymatic isomerization of a glucose-containing solution by the action of a glucose isomerase enzyme preparation, wherein said levulose-bearing syrup is characterized as containing from about 40% to about 45% levulose by weight, on a dry basis and less than about 2% psicose, by weight, on a dry substance basis, said syrup being further characterized as being substantially free of color bodies and ash.

2. The syrup of claim 1, wherein said product is further characterized as having an optical density of 0.02 to 0.3 measured at from 700 to 360 Nanometers, respectively, when said syrup is diluted to 1/10 of a 60%, by weight, dry basis sugar solution.

3. The levulose-bearing syrup of claim 1, wherein the enzymatic isomerization is conducted under non-oxidizing conditions.

4. An enzymatic isomerization product of glucose comprising at least 30% by weight, dry basis, of levulose, and less than 2% by weight, dry basis, of psicose.

5. A levulose-bearing syrup which has been produced by the enzymatic isomerization of a glucose-containing solution by the action of a glucose isomerase enzyme preparation, wherein said levulose-bearing syrup is characterized as containing a substantial amount of glucose and at least about 30% by weight, dry basis, of levulose, and less than 2% by weight, dry basis, of psicose.

6. A refined, levulose-bearing syrup which has been produced by the enzymatic isomerization of a glucose-containing solution by the action of a glucose isomerase enzyme preparation, wherein said levulose-bearing syrup is characterized as containing a substantial amount of glucose and at least about 30% by weight, dry basis, of levulose, and less than 2% psicose, by weight, on a dry substance basis, said syrup being further characterized as being substantially free of color bodies and ash.

7. The syrup of claim 6, wherein said glucose isomerase enzyme preparation is derived from a microorganism of the Streptomyces genus.

8. A levulose-bearing enzymatic isomerizate of a glucose-containing starch hydrolysate or of a solution containing dextrose that comprise a substantial amount of the original glucose or dextrose, at least 30% by weight, dry basis, of levulose, and less than 2% by weight, dry basis, of psicose.

9. A refined enzymatic isomerizate in accordance with claim 8 that is characterized as being substantially free of color bodies and ash.

10. A refined enzymatic isomerizate in accordance with claim 8 that is characterized as having an optical density of 0.02 to 0.3 measured at from 700 to 360 Nanometers, respectively, when diluted to 1/10th of a 60% by weight, dry basis, solution.

* * * * *

Dedication 3,910,821.—*Robert Paul Cory*, La Grange, Ill. ENZYMATIC ISOMERIZATION PRODUCT. Patent dated Oct. 7, 1975. Dedication filed Apr. 29, 1976, by the assignee, *CPC International Inc.*
Hereby dedicates to the Public the entire term of said patent.
[*Official Gazette June 1, 1976.*]